(12) United States Patent
Singh

(10) Patent No.: US 8,782,463 B1
(45) Date of Patent: Jul. 15, 2014

(54) RESTORING A FAILED STORAGE VOLUME AFTER REMOVAL OF A STORAGE DEVICE FROM AN ARRAY

(75) Inventor: Samaresh K. Singh, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 240 days.

(21) Appl. No.: 13/283,129

(22) Filed: Oct. 27, 2011

(51) Int. Cl.
G06F 11/00 (2006.01)

(52) U.S. Cl.
USPC .............................................. 714/6

(58) Field of Classification Search
USPC .............................................. 714/6
See application file for complete search history.

(56) References Cited

U.S. PATENT DOCUMENTS

| | | | |
|---|---|---|---|
| 6,032,211 A * | 2/2000 | Hewitt ........................... | 710/107 |
| 6,098,132 A * | 8/2000 | Olarig et al. .................. | 710/302 |
| 6,449,725 B2 | 9/2002 | Deenadhayalan et al. | |
| 6,587,909 B1 * | 7/2003 | Olarig et al. .................. | 710/302 |
| 6,654,797 B1 * | 11/2003 | Kamper ........................ | 709/220 |
| 6,665,786 B2 * | 12/2003 | McMichael et al. .......... | 711/173 |
| 6,766,469 B2 * | 7/2004 | Larson et al. ................. | 714/5.1 |
| 6,854,070 B2 * | 2/2005 | Johnson et al. ............... | 714/5.1 |
| 6,892,271 B2 * | 5/2005 | Piccirillo et al. ............. | 711/106 |
| 6,895,539 B1 * | 5/2005 | Aragona ........................ | 714/724 |
| 7,062,332 B2 * | 6/2006 | Matsuda ........................ | 700/19 |
| 7,185,614 B1 * | 2/2007 | Hansen .......................... | 1/1 |
| 7,200,694 B2 * | 4/2007 | Yakovlev et al. ............. | 710/48 |
| 7,231,550 B1 * | 6/2007 | McGuire et al. .............. | 714/26 |
| 7,320,086 B2 * | 1/2008 | Majni et al. ................... | 714/5.1 |
| 7,360,030 B1 * | 4/2008 | Georgiev ....................... | 711/141 |
| 7,451,353 B2 * | 11/2008 | Grimsrud ....................... | 714/42 |
| 7,843,906 B1 * | 11/2010 | Chidambaram et al. ...... | 370/386 |
| 7,843,907 B1 * | 11/2010 | Abou-Emara et al. ........ | 370/386 |
| 7,990,994 B1 * | 8/2011 | Yeh et al. ....................... | 370/431 |
| 8,218,538 B1 * | 7/2012 | Chidambaram et al. ...... | 370/386 |
| 8,291,159 B2 * | 10/2012 | Rajagopal et al. ............ | 711/111 |
| 8,443,126 B2 * | 5/2013 | Elboim ........................... | 710/302 |
| 8,560,775 B1 * | 10/2013 | McDuffee et al. ............. | 711/114 |
| 2003/0023826 A1 * | 1/2003 | McMichael et al. .......... | 711/173 |
| 2003/0120822 A1 * | 6/2003 | Langrind et al. .............. | 709/251 |
| 2008/0034087 A1 * | 2/2008 | Huetter .......................... | 709/224 |
| 2012/0110275 A1 * | 5/2012 | Ganti et al. .................... | 711/153 |
| 2012/0150816 A1 * | 6/2012 | Pafumi et al. ................. | 707/679 |
| 2013/0031341 A1 * | 1/2013 | Ganti et al. .................... | 713/2 |
| 2013/0117766 A1 * | 5/2013 | Bax et al. ....................... | 719/323 |
| 2013/0139128 A1 * | 5/2013 | Jones et al. .................... | 717/128 |
| 2013/0151646 A1 * | 6/2013 | Chidambaram et al. ...... | 709/213 |
| 2013/0311513 A1 * | 11/2013 | Piedmonte et al. ........... | 707/776 |

OTHER PUBLICATIONS

RAID Management—QNAP Turbo Nas Software User Manual, downloaded from the Internet on Aug. 23, 2011, http://docs.qnap.com/nas/en/raid_management.htm, 15 pages.

Cress, High-Level Design (HLD), SCSI RAS Tools, RAID-1 Enhancements for Linux, Jan. 21, 2003, 30 pages.

* cited by examiner

Primary Examiner — Amine Riad
(74) Attorney, Agent, or Firm — Hollingsworth Davis, LLC

(57) ABSTRACT

A storage device is detected as being decoupled from an apparatus. At least one partition of the storage device is part of a storage volume that includes an array of separate storage devices in an initial configuration prior to being decoupled. In response to the storage device being recoupled to the apparatus, a universally unique identifier (UUID) of the storage device is detected. In response to determining the UUID of the storage device was previously associated with the storage volume, the storage volume is reconfigured/restored to include the at least one partition of the storage device in the initial configuration.

23 Claims, 7 Drawing Sheets

RESTORING A FAILED STORAGE VOLUME AFTER REMOVAL OF A STORAGE DEVICE FROM AN ARRAY

SUMMARY

Various embodiments described herein are generally directed to methods, systems, and apparatuses that facilitate restoring a failed storage volume after removal of a storage device from an array. In one embodiment, a storage device is detected as being decoupled from an apparatus. At least one partition of the storage device is part of a storage volume that includes an array of separate storage devices in an initial configuration prior to being decoupled. In response to the storage device being recoupled to the apparatus, a universally unique identifier (UUID) of the storage device is detected. In response to determining the UUID of the storage device was previously associated with the storage volume, the storage volume is reconfigured/restored to include the at least one partition of the storage device in the initial configuration.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
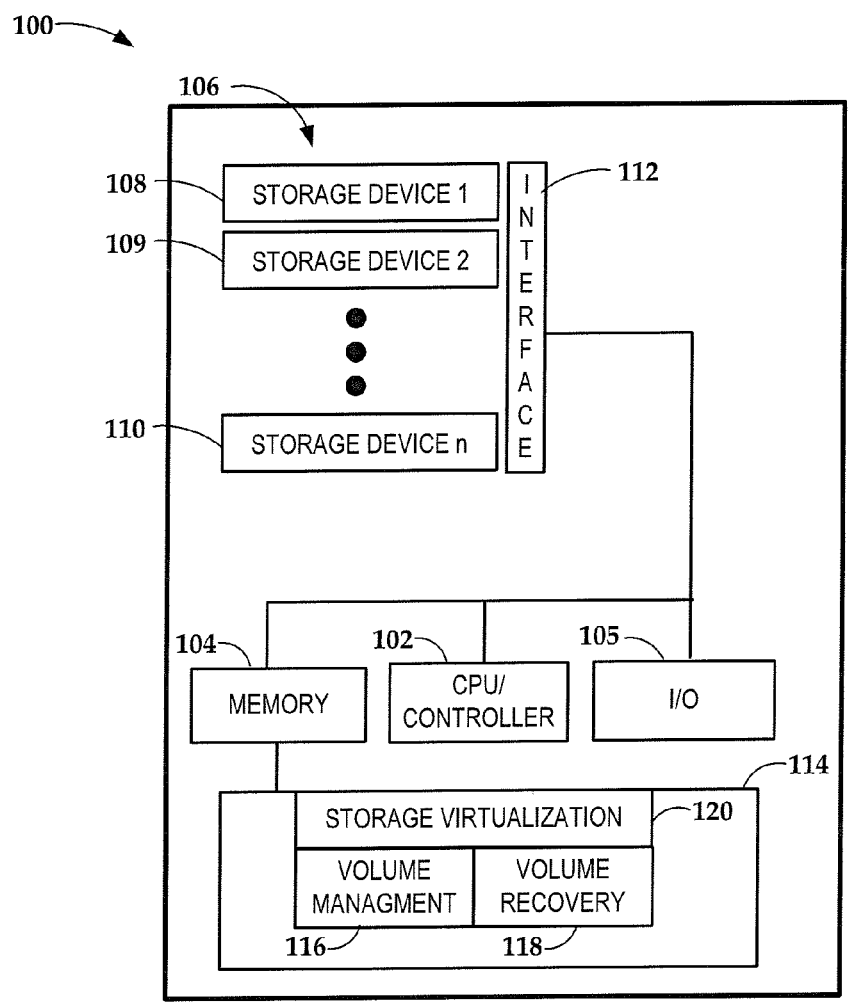
FIG. 1 is a block diagram of an apparatus according to an example embodiment.

The present disclosure relates generally to logical storage volumes used in computing systems. For example, methods, systems and apparatuses are described below that can recover from an inadvertent removal of a disk drive that is part of a disk array (e.g., RAID volume). Inadvertent removal of a drive (e.g., from a hot plug slot) can cause a disruption to or failure of a storage volume, depending on how the volume is configured. In the embodiments described below, a computing arrangement can be configured to recover from the removal if the drive is reinstalled soon after inadvertent removal. This can be applied to any type of logical storage volumes, and can recover multiple volumes that utilize the same physical storage device(s). This recovery can extend beyond drive recovery mechanisms provided by the volume, e.g., provided by RAID.

Generally, operating systems can abstract physical data storage devices (e.g., hard drives, flash memory devices, optical storage, etc.) as storage volumes in order to provide flexibility in defining and allocating physical resources. For example, a logical volume may include partitions from one or more hard drives. These partitions may be presented by a virtualization layer as a single logical storage volume, e.g., having a unique identifier, size, etc. This logical volume may be used by the operating system and applications the same was as single physical hard drive partition. The virtualization layer may provide additional features, such as allowing dynamic changes to the logical volumes, including reduction/expansion of the volume by adding, removing, and/or changing partitions. This can potentially be done without interrupting the system (e.g., without requiring a reboot), although depending on the action performed, the system may need to take some precautions before the changes occur (e.g., unmounting volumes, initiate scanning for newly added devices, etc.).

The virtualization layer may utilize assemble a logical volume by combining partitions "end-to-end" in what is sometimes referred to as spanning or "just a bunch of disks" (JBOD). The virtualization layer may also form the volumes as a redundant array of independent disks (RAID). A RAID volume distributes the data between multiple disks in a way that increases fault tolerance and/or increases data throughput. For example, RAID 0, or "striping" splits data between two or more partitions. This can result in an increase in throughput, although at the sacrifice of reliability. This is because RAID 0 uses no data redundancy, and so failure of only one drive will cause a failure of the whole array. In contrast, RAID 1, or "mirroring," duplicates the data on two or more disks, which increases reliability because the array can recover from a loss of at least one drive (and possibly more). A RAID 1 array does not, by itself, increase throughput performance, and may decrease performance in some cases.

Virtualization schemes utilizing RAID are popular in a number of applications. For example, servers may need to provide reliable data storage that can be flexibly reconfigured with minimal disruption to services. A special-purpose server device, sometimes referred to as network attached storage (NAS), is focused on providing a particular service—persistent storage via a network. Just as a storage virtualization layer can abstract storage devices to a computer, a NAS can abstract storage services to a network using standard network protocols such as TCP/IP. An NAS can be added or remove to dynamically modify available storage without interruption of those services.

Another use of networks for storage is termed storage attached networks (SAN). A SAN uses network technology to couple storage devices to servers. Unlike a NAS, a SAN provides block-level access to the storage devices, and access to the devices is not generally shared to all devices on a local network. A SAN may use specialized protocols such as Fibre Channel Protocol (FCP), Fibre Channel over Ethernet (FCoE), ATA over Ethernet (AoE), etc.

A server, NAS, or SAN may utilize "hot-swap" storage interfaces that enable adding and removing physical storage devices without shutting off the host computer. Another term, "hot plugging," is used to describe the ability to add a new storage device without system interruption. For the purposes of this disclosure, the term "hot swap" or "hot plug" may refer to any removal or insertion actions related to a hard drive that may occur without system shutdown and/or interruption.

A hot-swap interface may include physical and electrical characteristics that ensure drive swapping can occur without affecting system operation. For example, a hot swap interface may include a bay with sliding cavities and quick-disconnect connectors that enable the drives to be added and removed without using tools or opening the device's case. The connectors may be coupled to a common circuit board (e.g., a backplane) that provides an intermediary electrical interface between the drives and the host.

Some drive interface standards support hot-swapping of drives, including small computer interface (SCSI) and serial attached SCSI (SAS), serial advanced technology attachment (SATA), external SATA (eSATA), etc. These standards include electrical and protocol features that allow for poweron electrical disconnection of drives. The host operating system may also have provisions for dealing with the drive removal to ensure that the addition or removal of a device does not lead to a system failure. For example, an operating system may allow (or require) a volume to which the drive belongs to be unmounted before it is removed.

In reference now to FIG. 1, a block diagram illustrates an apparatus 100 according to an example embodiment. For purposes of discussion, the apparatus 100 may be described as a NAS server, although the concepts may be applicable to any computing arrangement known in the art that utilizes logical storage volumes. The apparatus 100 includes a processor 102, which may be a general-purpose central processing unit (CPU) or specialized controller. The processor is coupled to memory 104, which may include any type of volatile or non-volatile memory. The memory 104 may at least include random-access memory (RAM) usable by the processor 102 for storing instructions and data.

The processor 102 is also coupled to input-output (I/O) circuitry 105 that enables the processor to communicate with devices both within and external to the apparatus 100. Devices coupled to the I/O 105 may include user interface hardware, network interfaces, sensors/transducers, etc., as well as data storage devices, represented here by data storage array 106. Generally, the data storage array 106 includes two or more discrete persistent data storage devices 108-110. In this context, "discrete" refers to the devices have separate physical and electrical components so that, e.g., one device 108-110 can be removed independently of others of the devices 108-110.

In this example, the devices 108-110 are coupled to a common data storage interface 112. This interface 112 may include, e.g., mounting slots, backplane, cables, peripheral cards, etc., that couple the storage array 106 to the rest of the apparatus 100. This interface 112 may comply with one or more storage interface protocols, such as SCSI, SAS, eSATA, Fibre Channel, etc. The storage array 106 may be wholly contained within the host apparatus 100, or may have some physically external components (e.g., may include SAN or external drives).

The apparatus 100 includes instructions 114 stored on a media that enable operation of the apparatus 100. This media 114 may include any combination of persistent rewritable data storage (e.g., hard drive, flash memory), volatile random access memory, embedded firmware, and/or instructions hard-coded into logic circuitry. These instructions 114 may include operating systems, drivers, applications, basic input-output system (BIOS), hypervisor, etc. For purposes of this discussion, various modules related to the storage system, volume management 116, volume recovery 118, and virtualization layer 120, may be configured as operating system level components such as drivers and services, although this functionality may be provided at other levels of abstraction in the apparatus 100. Generally, this virtualization layer 120 manages formatting and distributing data among the storage devices 108-110 and performing additional calculations (e.g., determining parity data for RAID 5).

Figure 2A:
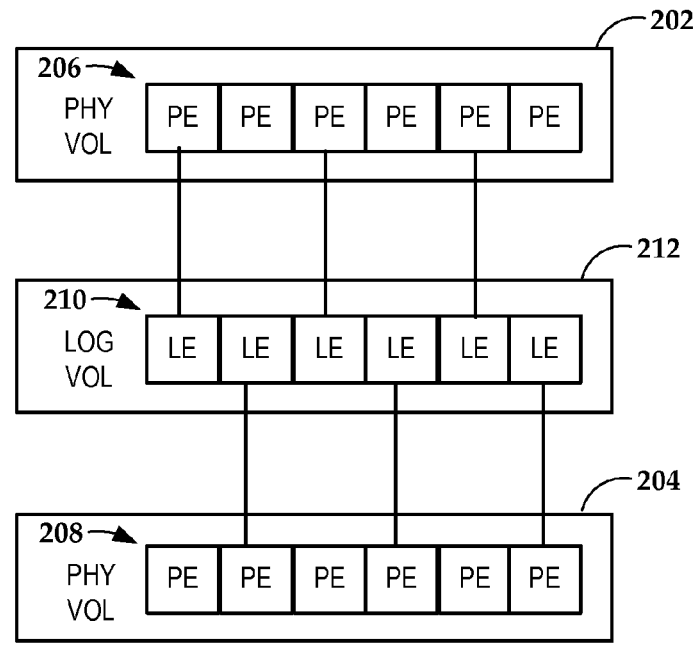
FIGS. 2A and 2B are block diagrams of a volume groups and logical volumes according to example embodiments.

Volume management 116 represents one of the forms of storage virtualization 120. This component 116 may enable user definition of arrays/volumes, facilitate monitoring and changing those arrays/volumes, etc. In reference now to FIG. 2A, a block diagram illustrates a view of an architecture used in managing volumes according to an example embodiment. Volume management may be based on physical volumes (PVs) 202, 204 that may include any combination of hard disks, hard disk partitions, logical unit numbers (LUNs) on external storage device, etc. Physical volumes can be treated as sequence of chunks called physical extents (PE) 206, 208. In an operating system such as Linux, logical volume management the physical extents map one-to-one with logical extents (LE) 210.

The physical extents 206, 208 are drawn from a physical volume group (PVG) 208, which includes a set of similar or dissimilar sized physical extents 206, 208. The system pools the logical extents 210 into a volume group (VG) (see VG 222 in FIG. 2B). The pooled logical extents 210 can then be grouped together under virtual disk partitions called logical volumes (LV) 212. Systems can use an LV 212 as a raw block device such as a disk partition. For example the system can create a mountable file system on the LV 212, or use the LV 212 as swap storage for virtual memory. Storage volumes created under different logical volume management schemes allow us the flexibility of resizing file systems and/or moving them at will, sometimes on-the-fly without interrupting applications.

Figure 2B:
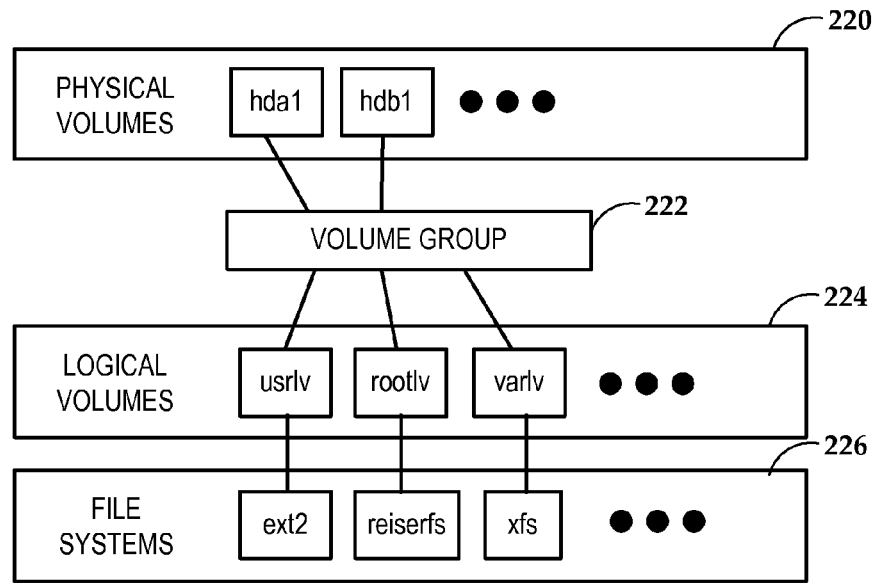

In FIG. 2B, a block diagram illustrates another view of volume management according to another example embodiment. In this example, physical volumes 220 are annotated with Linux partition naming conventions (e.g., /dev/hda1), indicating these physical volumes 220 may include whole disk drives or partitions thereof. The physical volumes 220 are mapped to PEs and LEs, where they are pooled into a volume group 222. The LEs of the volume group 222 can be selected to form a set of logical volumes 224. The logical volumes 224 may be mapped to filesystems 226, which create the structures and support commands needed to represent data as files. While not shown, the logical volumes 224 may also be configured as raw partitions (e.g., without an explicit filesystem), for uses such as virtual memory, database stores, etc.

In the discussion that follows, embodiments are described that utilize RAID to assemble logical volumes, and utilize Linux utilities (mdadm, etc.) to manage logical volumes in a device such as an NAS. For example, RAID may be used to join several drives as a single volume. Different RAID schemes can be selected based on desires for increased capacity, speed, reliability, and/or combinations thereof. The mdadm utility, whose name makes reference to management of multi device (MD) nodes, is an operating system resident utility (e.g., implemented in the kernel) that can be used to define and manage RAID volumes or other MD storage devices. It will be appreciated that other utilities may perform similar functionality as mdadm both for Linux and for other operating systems. For example, RAID can be implemented in hardware, e.g., using a peripheral device that couples to an array of devices and provides I/O or BIOS level RAID functionality using a firmware/hardware controller. Accordingly, the examples presented herein are provided for purposes of illustration and not limitation.

For the uninterrupted operation of logical volumes, some portion of the physical hard disks need to remain connected to the system during operation, e.g., while online. If the physical hard disks are removed intentionally or unintentionally, event (s) are triggered that cause the system to continue to either serve volumes using existing disks (but possibly in a degraded mode) or lose the logical volume(s) completely. For example, if a RAID 0 partition is removed, then the logical volume will no longer operate, and may be marked as permanently failed by the hardware/firmware that maintains the drive. In contrast, if a partition of a removed hard disk is part of a RAID 1 volume, the volume can still operate, albeit with loss of the redundancy provided by the removed partition. If the removed hard disk is part of a RAID 5 volume (data and parity blocks divided between three or more partitions), then the volume may continue operating in a degraded mode. Moreover, if a partition of a removed hard disk is part of a degraded RAID5 volume OR if partitions of removed hard disks of a properly functioning RAID5 volume, the logical RAID5 volume will be marked as permanently failed by the hardware/firmware that maintains the drive and other elements.

Even if the removed drive is reinstalled right after being removed, the system may not be set up to immediately rebuild the affected volumes, even if no data corruption occurred. For example, this could be treated as a hard drive failure or the like, which, under some circumstances, may require significant maintenance to correct, e.g., obtaining and formatting a replacement unit, unmounting affected volumes, reconfiguring the volumes to include the replacement, etc. Whether the drive is removed inadvertently or if the drive fails, the system needs to account for the missing device partitions with what is expected. However, in the former case, this data can be automatically determined, because recovery will involve recreating the previous configuration, and would not require creation of a new configuration as would be needed in the latter case.

Hereinbelow, an example process will be outlined that allows automatic recovery of failed volumes in a data storage device. This process may be used in situations where the affected disks are removed intentionally or accidentally, and where the affected disks are not subjected to a complete failure such that the disk cannot be reused or the disk(s) subjected to any electrical, mechanical, electronic or other such process to cause any kind of modification in the original data and metadata of the disks. So, for example, if removal of a disk causes a failed mode or reduced redundancy but not data loss or corruption, then the process can be used to automatically place the storage volume in a similar condition/configuration as existed before the removal occurred. This process can also be used where such removal results in what might be flagged as permanent failure of the volume by the underlying virtualization scheme (e.g., removal of one disk of a RAID 0 array, removing N−1 disks of an N-disk RAID 5 array). In such a case, the volumes can still be rebuilt with whatever data was originally stored in the member disks/partitions before the removal event, and may be able to create a working volume, even if some data corruption is found after reassembly of the volume.

The process for recovering volumes may use a utility such as Linux mdadm, as well as using outputs from shell commands such as "cat" and "ls" to determine information about the proc and sys filesystems. For purposes of the facilitating the following discussion, a storage volume array 300 according to an example embodiment is shown in the block diagram in FIG. 3. This array 300 includes four physical storage devices 302-305, e.g., hard disk drives, which are used to form six logical storage volumes 310-315.

Figure 3:
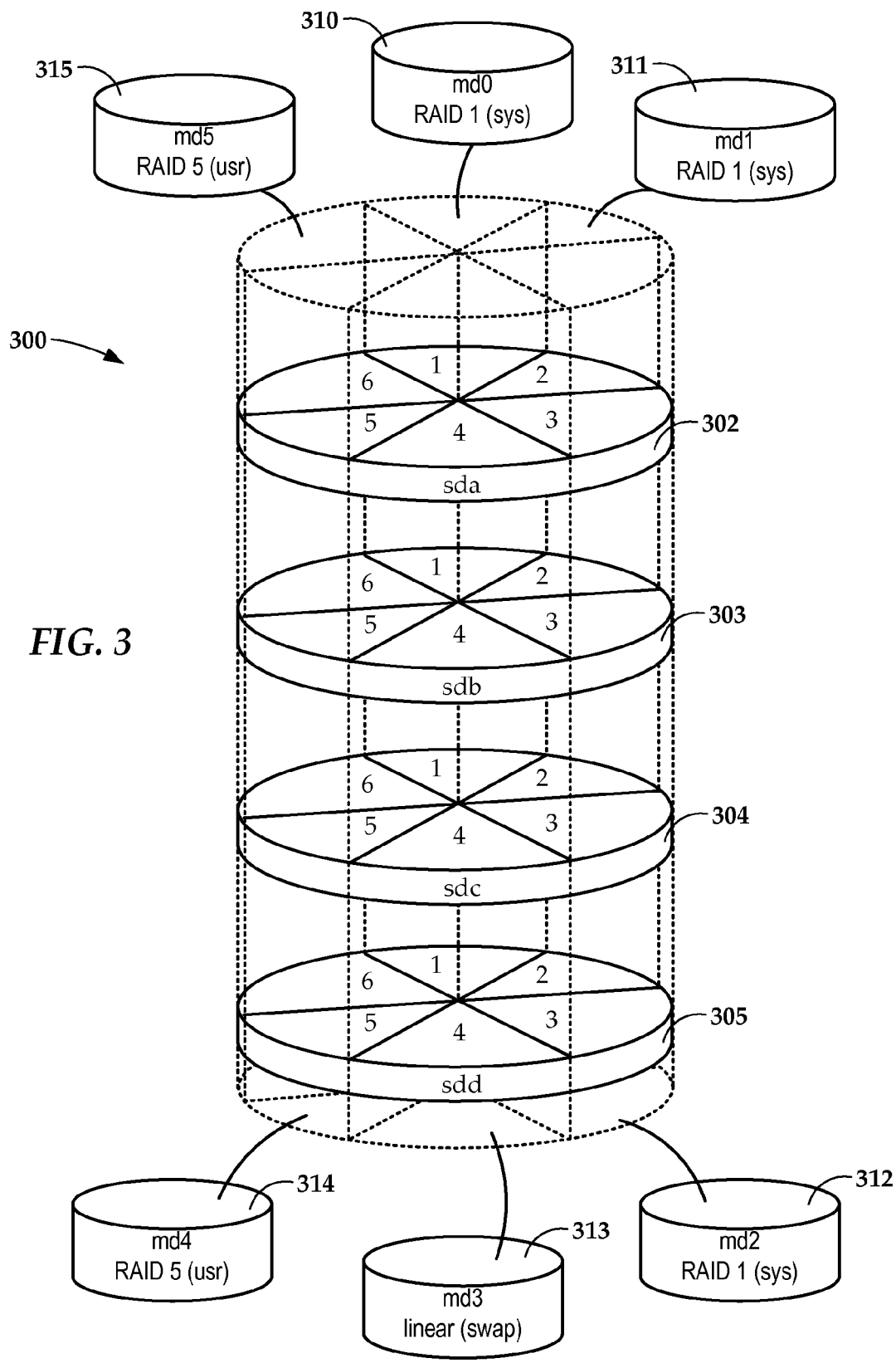
FIG. 3 is a block diagram of multi-device logical volumes according to another example embodiment.

Each hard drive 302-305 is assigned a Linux device identifier (e.g., sda, sdb, etc.) and is divided into six partitions, as indicated by the numerals 1-6 on each drive 302-305. For example, drive 302 would include partitions sda1, sda2, etc. Six multi-device, logical volumes 310-315 are formed from these partitions. Volumes 310-311 are used as system volumes (e.g., for storing operating system files) and are configured as RAID 1 (mirrored) arrays. Devices 314 and 315 are user volumes and are configured as RAID 5 arrays. It should be noted that the representation of the drives 302-305 in FIG. 3 is not intended to reflect the relative sizes of the partitions. For example, in a device such as an NAS, the user partitions 314, 315 may be much larger than the system partitions 310-312.

An example output of an mdadm status file (/proc/mdstat) is shown below in Listing 1. Listing provides an example configuration that may be used to form the volumes 310-315 shown in FIG. 3. As this indicates, each of the volumes 310-315 (md0-md5) are spread among the four disks 302-305.

Listing 1

```
$ cat /proc/mdstat
Personalities : [linear] [raid0] [raid1] [raid10] [raid6]
[raid5] [raid4]
md5 : active raid5 sdd6[4] sda6[0] sdc6[2] sdb6[1]
      104857344 blocks super 1.2 level 5, 64k chunk,
algorithm 2 [4/4] [UUUU]
md4 : active raid5 sdd5[4] sda5[0] sdc5[2] sdb5[1]
      52428480 blocks super 1.2 level 5, 64k chunk, algorithm
2 [4/4] [UUUU]
md3 : active linear sda4[0] sdd4[3] sdc4[2] sdb4[1]
      139810048 blocks super 1.2 64k rounding
md1 : active raid1 sdd2[3] sda2[2] sdc2[0] sdb2[1]
      1044800 blocks [4/4] [UUUU]
md2 : active raid1 sdd3[3] sda[2] sdc3[0] sdb3[1]
      521408 blocks [4/4] [UUUU]
md0 : active raid1 sdd1[3] sda1[2] sdc1[0] sdb1[1]
      1043840 blocks [4/4] [UUUU]
unused devices: <none>
```

Because the system volumes 310-311 are configured as RAID 1, the system partitions on any one of the drives 302-305 can be used to run an operating system even if the entire volume array 300 is marked as failed by the system, e.g., due to an inadvertent removal of one or more drives 302-305. This is because a system can use a RAID 1 partition as a standalone disk partition outside of RAID. An apparatus may need to take precautions to ensure the logical system volumes of a failed array 300 are correctly reproduced after use of one member partition in this way. For example, a selected system partition could be mounted read-only for purposes of recovery, and any data that might need to be written to the logical system volumes can be stored elsewhere (e.g., flash memory) until after recovery is complete. Or, the system partition could be mounted read-write, and the logical system partition rebuilt using the selected partition as a master copy. In another example, an apparatus 100 such as shown in FIG. 1 may have a full or partial copy of system software stored in memory 104 outside the disk drives (e.g., in flash memory), and the recovery operations can be run using systems software that operates from this alternate location.

Figure 4:
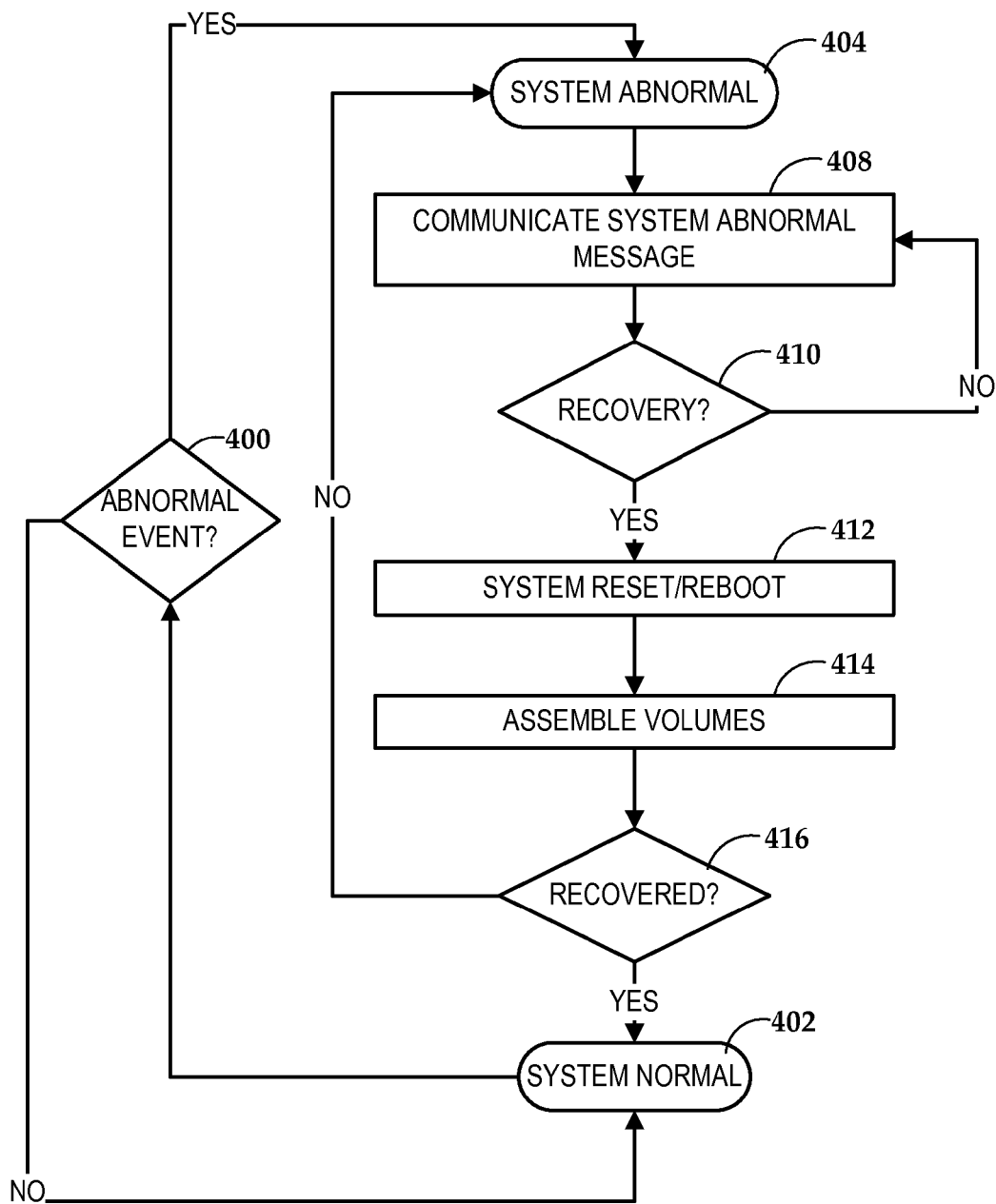
FIGS. 4-6 and 7A-B are flowcharts illustrating procedures according to example embodiments.

In reference now to FIG. 4, a flowchart illustrates a high-level process flow according to an example embodiment. An event 400 (e.g., an inadvertent removal of a physical drive 302-305) causes the system to transition from a normal state 402 to an abnormal state 404. A message is communicated 408 regarding the event 400. This message could be sent/shown 408 to any combination of a system console, logfile, graphical user interface, external messaging network, etc.

In response to communicating 408 the message, a recovery 410 may be attempted. This decision 410 could be expressly communicated via a user/administrator, and/or could be performed automatically. For example, if the event 400 is an inadvertent removal of a physical drive, the recovery decision 410 could be triggered after the drive is reinserted and/or after the system is reset or rebooted. If the event 400 is a failed drive, then more significant intervention may be needed. For example, the system may be brought off-line for hardware replacement and reconfiguration.

If the decision 410 is made to attempt recovery (e.g., event 400 did not involve hardware or software failure), the system may be reset 412, which may involve any combination of a hardware reboot, resetting of virtual hardware environment, halting/suspending particular processes that utilize the affected volumes, unmounting one or more volumes, etc. After reset 412, the system begins the process of automatically assembling 414 the volumes to the normal state 402 they were in before the event 400 occurred. This assembly process 414 will be described in greater detail below. If it is determined 416 that assembly 414 has recovered the volumes, the system can return to the normal state 402.

When a disk is removed from a storage device, it may cause the number of disk partitions to be lost that are being used by the logical, multi-device volumes (e.g., md0, md1, etc.). A utility such as mdadm utilizes a universally unique identifier (UUID) that is associated with the logical volume. This UUID is also written to a superblock of the partitions that are part of the volume. In this way, the volume can be recreated as needed by matching the UUIDs between partitions and volumes. However, it has been found that in response to an event such as an inadvertent disconnection of a drive, the utility will not automatically add the partitions of the removed drive back into the arrays.

Figure 5:
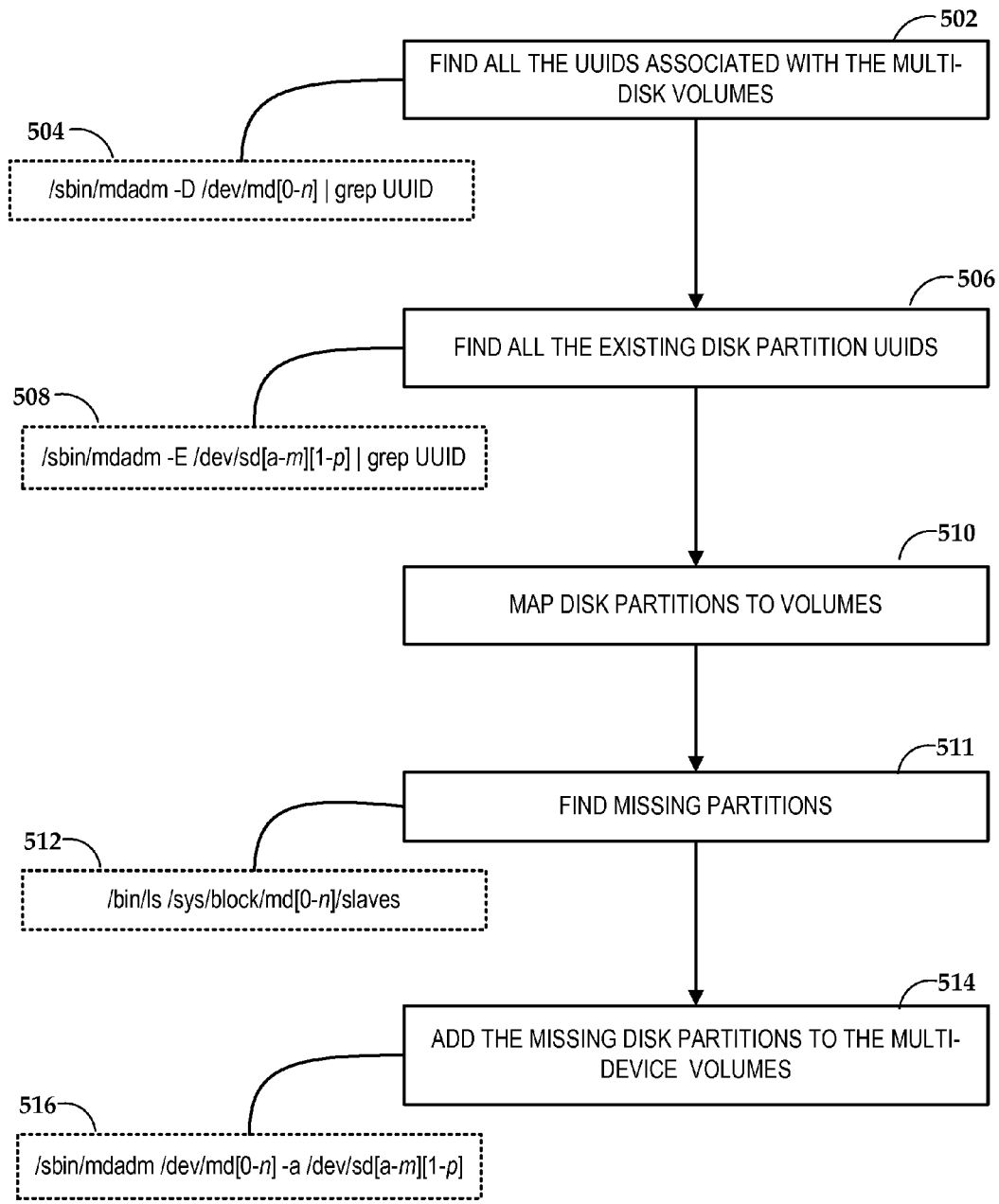

In reference now to FIG. 5, a flowchart illustrates an example procedure for assembling the logical volumes after a disruption of disks (or similar event) according to an example embodiment. First, all the UUIDs associated with the multi-disc volumes are found 502. An example of how this data may be obtained is shown in block 504, by using the "-D" command line switch (or "-- detail") of the mdadm command (e.g., executed via a command line shell program or script). The output of mdadm is piped to a regular expression parser (grep) which, in this example, will list all the lines containing the string "UUID." The output of "mdadm -D" will list the volume's UUID on it own line such as "UUID:" with a character string that represents a 128-bit ID.

In a similar fashion to operation 502, all the UUIDs associated with existing disk partitions are also found 506. This can be done with the mdadm command, this time using the "-E" (or "--examine") command line switch as shown in block 508. With the data obtained from blocks 502 and 506, the disk partitions can be mapped 510 to (e.g., linked to, associated with) the volumes to which the partitions belong. This mapping can be used as input to block 511, where the missing partitions are found.

The virtualization layer (e.g., component 120 in FIG. 1) may create directories that also associated disk partitions with multi-device volumes. When using mdadm in Linux, these partitions are listed under a device directory, "sys," used by the kernel. The multi-device volumes listed as block devices under the "/sys/block" directory, and the partitions used by the volumes are listed in subdirectories, e.g., in "/sys/block/<md_volume>/slaves" directory. As a result, the partitions currently being used by a logical volume can be enumerated using the "ls" command as shown by way of example in block 512. For example, the output of "ls /sys/block/md0/slaves" for the arrangement shown in FIG. 3 would include "sda1 sdb1 sdc 1 sdd1," assuming all these partitions are currently being used.

The output of command 512 can be compared with the disk partitions found at block 510 that have the same UUID as the volume represented by the listed directory to find 511 partitions that are missing. Any missing partitions found at 511 can be added to the volumes at block 514. An example command for doing this, again using the mdadm utility, is shown in block 516. The "-a" switch will cause the partition indicated by the last argument to be added to the logical volume indicated by the first argument.

Figure 6:
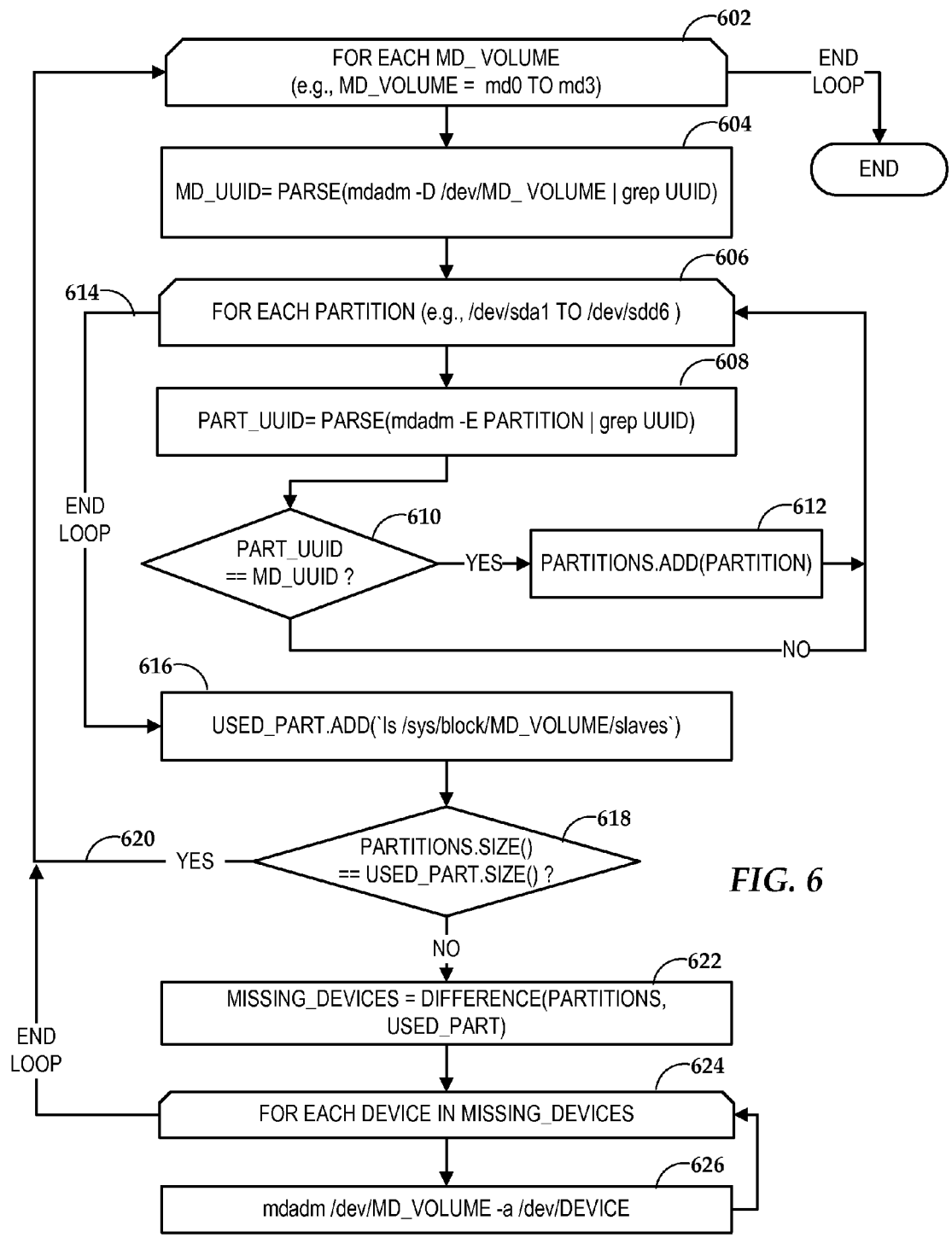

In reference now to FIG. 6, a flowchart illustrates a more detailed procedure for detecting disconnected partitions and reassembling volumes according to an example embodiment. The procedure includes an outer loop 602 that iterates over each of the multi-device volumes, indicated within the loop by the MD_VOLUME variable. For this example procedure, only the system volumes md0-md3 (see volumes 310-312 in FIG. 3) are affected, although a similar procedure may be performed for the other volumes, including RAID 5 user volumes md4 and md5 (see volumes 314-315 in FIG. 3).

The UUID of the current volume, MD_UUID, is obtained 604 using a command similar to command 504 shown in FIG. 5. Also shown in this block 604 is a function called PARSE will extract the UUID from the output line, e.g., strip out line header and whitespace, etc. This UUID may be stored as a text or number in variable MD_UUID. A second loop 606 is then iterated through, selecting a new value of the variable PARTITION for each loop. In this case, the loop 606 iterates through all partitions on the system, e.g., all partitions /dev/sda1 to /dev/sdd6 shown in FIG. 3. The number of iterations through loop 606 may be reduced, e.g., by only iterating through a subset of partitions on the apparatus. For example, the subset may selected based on whether the partitions are used in creating logical volumes (as opposed to being used directly as physical drives/partitions), and/or whether the partitions are known to have been used with the current volume, MD_VOLUME.

At block 608, the UUID of the current partition is stored in a variable, PART_UUID. This block 608 uses a similar convention as block 604, although with the mdadm switch "-E" as shown in command 508 of FIG. 5. If the result of test 610 is that the partition UUID is equal to the UUID of the MD_VOLUME for this loop 602, then the PARTITION value is added 612 to a collection variable labeled PARTITIONS. The PARTITIONS variable may be a list, array, set, tree, etc., and is used after loop 606 exits, as indicated by path 614, which passes control to block 616.

At block 616, a variable, USED_PART, is a collection that has a items (e.g., text strings) added to it using the "ls" command, similar to the command 512 shown in FIG. 5. The items stored in USED_PART are the partitions in the "/sys/block/MD_VOLUME/slaves" directory. The result of blocks 612 and 616 is two collections: PARTITIONS which contains a list of partitions related to MD_VOLUME by UUID, and USED_PART, which is a list of partitions actually being used by the MD_VOLUME. These sizes of collections are compared 618, and if equal, then there are no missing partitions from this volume, and control is passed back to the beginning of the main loop 602, as indicated by path 620.

If the comparison at 618 determines that the sizes of the PARTITIONS and USED_PART collections are unequal, then another collection, MISSING_DEVICES, is formed 622 based on the differences between the two. In this example 622, a function called DIFFERENCE compares the two collections and returns all objects that are in one collection but not in the other. This collection is iterated through via loop 624, where the missing partitions are added 626 to the associated multi-device volume. Adding 626 can be accomplished using a command similar to command 516 shown in FIG. 5.

Once processes, such as those described in FIGS. 4-6, are executed, all the missing disk partitions may be restored to one or more multi-device volumes. This restoration may occur as part in response to a variety of triggers, including an automatic detection of an inserted drive, user initiated process (e.g., via command line or graphical user interface), boot sequence, etc. For example, if a user inadvertently removes a storage device (e.g., hot-plug hard drive) from a device (e.g., NAS), the user can reinstall the drive and reboot the device. A procedure will be performed in reboot to detect UUIDs of volumes and associated partitions, and further determine which partitions are actually mounted (e.g., shown in a directory structure maintained by the kernel).

Figure 7A:
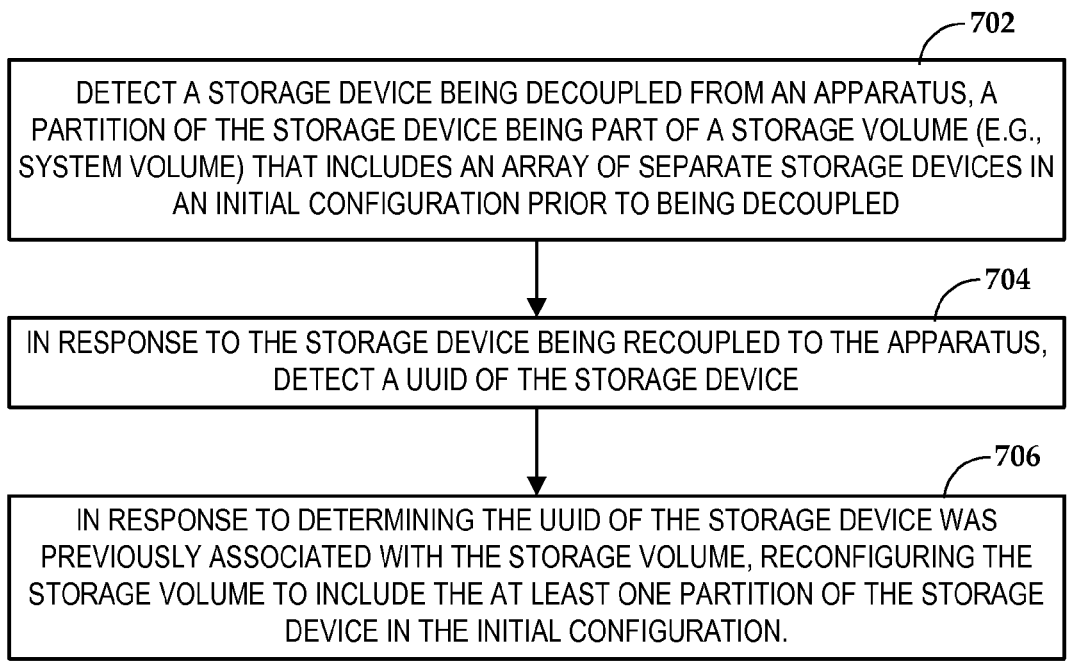

In reference now to FIG. 7A, a flowchart illustrates another process according to an example embodiment. A storage device is detected 702 as being decoupled from an apparatus. At least one partition of the storage device is part of a storage volume that includes an array of separate storage devices in an initial configuration prior to being decoupled. The storage volume may include a RAID volume, and/or may be implemented in an operating-system-resident logical volume manager of the apparatus. For example, the storage volume may include a system volume that stores a bootloader, kernel, root file system, system configuration and other elements of the operating system, etc. Decoupling of the storage device may cause at least a degraded operation of the storage volume and the decoupling may be unintentional.

In response to the storage device being recoupled to the apparatus, a universally unique identifier (UUID) of the storage device is detected 704. In response to determining the UUID of the storage device was previously associated with the storage volume, the storage volume is reconfigured 706 to include the at least one partition of the storage device in the initial configuration. Determining that the UUID of the storage device was previously associated with the storage volume may involve enumerating all of the UUIDs associated with the storage volume via the logical volume manager, and determining whether any of the enumerated UUIDs are missing in a file system device directory associated with the storage volume.

Figure 7B:
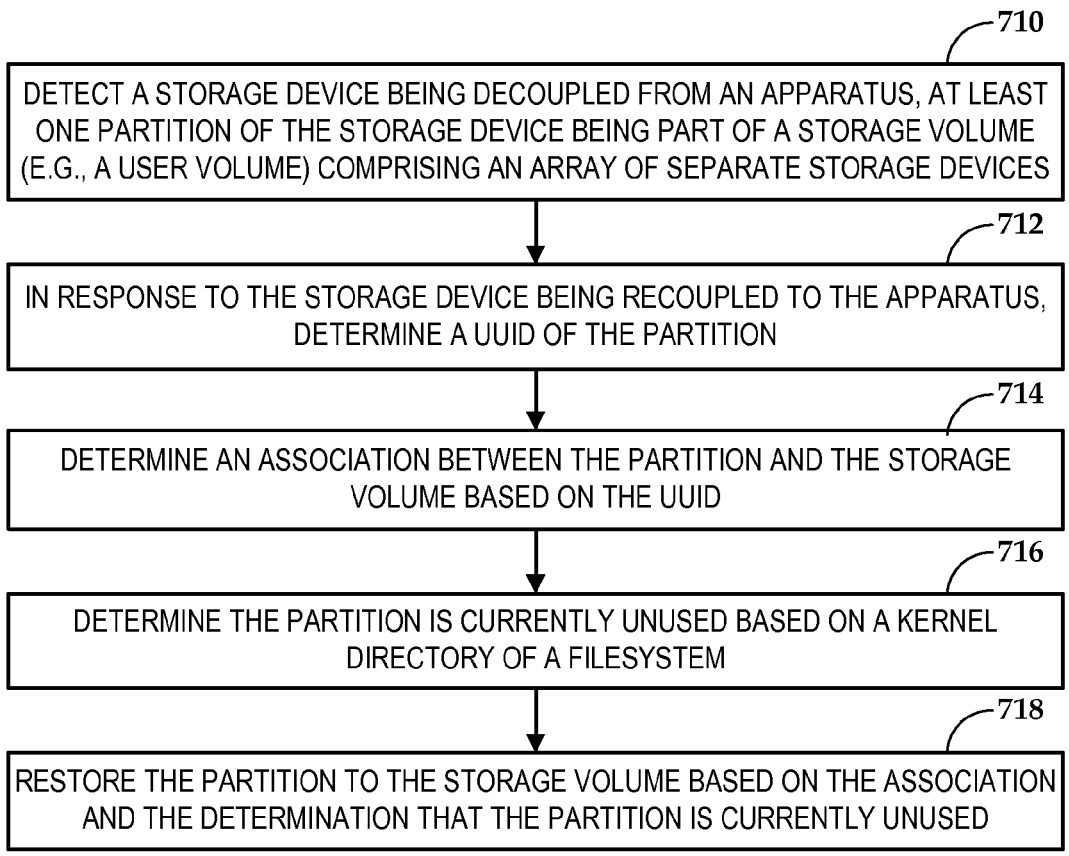

In reference now to FIG. 7B, a flowchart illustrates another process according to an example embodiment. A storage device is detected 710 as being decoupled from an apparatus. At least one partition of the storage device is part of a storage volume that includes an array of separate storage devices in an initial configuration prior to being decoupled. The storage volume in this case may be a user volume. In response to the storage device being recoupled to the apparatus, a UUID of the partition id determined 712. An association between the partition and the storage volume based on the UUID is also determined 714. Another determination 716 is made that the partition is currently unused based on a kernel directory of a filesystem. In response to these determinations 714, 716, the partition is restored 718 to the storage volume.

The various embodiments described above may be implemented using circuitry, firmware, and/or software modules that interact to provide particular results. One of skill in the arts can readily implement such described functionality, either at a modular level or as a whole, using knowledge generally known in the art. The structures and procedures shown above are only a representative example of embodiments that can be used.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    detecting a storage device being decoupled from an apparatus, wherein at least one partition of the storage device is part of a storage volume comprising an array of separate storage devices in an initial configuration prior to being decoupled;
    in response to the storage device being recoupled to the apparatus, detecting a universally unique identifier (UUID) of the storage device; and
    in response to determining the UUID of the storage device was previously associated with the storage volume, reconfiguring the storage volume to include the at least one partition of the storage device in the initial configuration.

2. The method of claim 1, wherein the decoupling of the storage device causes a failure of the storage volume.

3. The method of claim 1, wherein the storage device is unintentionally decoupled from the apparatus by a user.

4. The method of claim 1, wherein the storage volume comprises a redundant array of independent disks (RAID) volume.

5. The method of claim 1, wherein the storage volume is implemented in an operating-system-resident logical volume manager of the apparatus.

6. The method of claim 5, wherein determining the UUID of the storage device was previously associated with the storage volume comprises:
    enumerating all of the UUIDs associated with the storage volume via the logical volume manager; and
    determining whether any of the enumerated UUIDs are missing in a file system device directory associated with the storage volume.

7. The method of claim 1, wherein the apparatus comprises a network attached storage (NAS) device.

8. An apparatus comprising:
    a data interface capable of being coupled to an array of separate storage devices that form a storage volume;
    a controller coupled to the data interface and configured to:
        detect at least one of the storage devices being decoupled from the data interface, wherein at least one partition of the storage device is part of an initial configuration of the storage volume prior to being decoupled;
        in response to the storage device being recoupled to the data interface, detect a universally unique identifier (UUID) of the storage device; and
        in response to determining the UUID of the storage device was previously associated with the storage volume, reconfigure the storage volume to include the at least one partition of the storage device in the initial configuration.

9. The apparatus of claim 8, wherein the decoupling of the storage device causes a failure of the storage volume.

10. The apparatus of claim 8, wherein the storage device is unintentionally decoupled from the apparatus by a user.

11. The apparatus of claim 8, wherein the storage volume comprises a redundant array of independent disks (RAID) volume.

12. The apparatus of claim 8, wherein the storage volume is implemented in an operating-system-resident logical volume manager of the apparatus.

13. The apparatus of claim 12, wherein determining the UUID of the storage device was previously associated with the storage volume comprises:
    enumerating all of the UUIDs associated with the storage volume via the logical volume manager; and
    determining whether any of the enumerated UUIDs are missing in a file system device directory associated with the storage volume.

14. The apparatus of claim 12, wherein the apparatus comprises a network attached storage (NAS) device.

15. A method comprising:
- detecting a storage device being decoupled from an apparatus, wherein at least one partition of the storage device is part of a storage volume comprising an array of separate storage devices;
- in response to the storage device being recoupled to the apparatus, determining a universally unique identifier (UUID) of the partition;
- determining an association between the partition and the storage volume based on the UUID; and
- determining the partition is currently unused based on a kernel directory of a filesystem, and in response thereto, restoring the partition to the storage volume based on the association.

16. The method of claim 15, wherein the decoupling of the storage device causes a failure of the storage volume.

17. The method of claim 15, wherein the storage device is unintentionally decoupled from the apparatus by a user.

18. The method of claim 15, wherein the storage volume comprises a redundant array of independent disks (RAID) volume.

19. The method of claim 15, wherein the storage volume is implemented in an operating-system-resident logical volume manager of the apparatus.

20. The method of claim 15, wherein the apparatus comprises a network attached storage (NAS) device.

21. The method of claim 1, wherein the storage volume is reconfigured to include the at least one partition of the storage device using data originally stored in the storage device prior to being decoupled.

22. The apparatus of claim 8, wherein the storage volume is reconfigured to include the at least one partition of the storage device using data originally stored in the storage device prior to being decoupled.

23. The method of claim 15, wherein the partition is restored to the storage volume using data originally stored on the partition prior to the storage device prior to being decoupled.

* * * * *